United States Patent [19]
Ferreira et al.

[11] 4,391,734
[45] Jul. 5, 1983

[54] MINERAL TREATMENT AND COMPOSITION

[75] Inventors: Laurence E. Ferreira, Pacific Palisades, Calif.; Richard S. Lamar, Littletown, Colo.; Ralph J. Bertolacini, Naperville, Ill.

[73] Assignee: Standard Oil Company (Indiana), Chicago, Ill.

[21] Appl. No.: 297,275

[22] Filed: Feb. 28, 1981

[51] Int. Cl.³ .................... C04B 33/02; C04B 33/04
[52] U.S. Cl. ................................ 252/378 R; 501/148
[58] Field of Search .................... 501/148; 252/378 R

[56] References Cited

U.S. PATENT DOCUMENTS

| | | | |
|---|---|---|---|
| 2,652,338 | 9/1953 | Greger | 501/148 |
| 2,659,412 | 11/1953 | Heyman | 252/278 R |
| 3,439,801 | 4/1969 | Morris et al. | 501/148 |

FOREIGN PATENT DOCUMENTS 6402148 9/1964 Netherlands ...................... 501/148

OTHER PUBLICATIONS

Khodakov et al., "Experimental Investigation of Spontaneous Dispersion in Molecularly Compact Solid Aggregates", Kolloidnyi Zhurnal, vol. 31, No. 5, pp. 771-776, (1969).

Khodakov et al., "The Effect of the Medium on the Fine Dispersion of Solids", Kolloidnyi Zhurnal, vol. 22, No. 3, pp. 365-375, (1960).

*Primary Examiner*—Mark Bell
*Attorney, Agent, or Firm*—James R. Henes; William T. McClain; William H. Magidson

[57] ABSTRACT

A method for treating a phyllosilicate mineral by grinding a slurry of particles of the mineral in an organic medium and the product formed thereby are disclosed.

15 Claims, 10 Drawing Figures

MINERAL TREATMENT AND COMPOSITION

BACKGROUND OF THE INVENTION

This invention relates generally to a method for treating a phyllosilicate mineral and to the product of such method and more particularly concerns a method for treating a phyllosilicate mineral by grinding a slurry of particles of the mineral in an organic liquid to thereby produce particles having a relatively greater specific surface area and also the product formed by such method.

It is well known that phyllosilicate minerals are useful in a variety of applications as fillers, pigments, adsorbents, absorbents, catalysts, inert diluents or carriers for materials adsorbed or otherwise immobilized on their surfaces. The specific surface area of a particular phyllosilicate mineral is an important property in determining the suitability of the mineral for such uses. In many applications, it has been found that the higher the specific surface area of a mineral, the more effective is the mineral.

When the mineral is to be used as a filler or pigment in a second material or as an adsorbent, absorbent or carrier for a second material, the bonding characteristics of the mineral to the second material are important factors in determining the suitability of the mineral in such use. The bonding characteristics in such cases are at least partly determined by the amount and character of the surface area of the mineral available for bonding to the second material. Similarly, surface area is a property which at least partly determines the adsorptive capacity of a mineral. For these and other reasons, it is generally considered to be highly desirable to devise means for increasing the surface area of mineral particles.

In the case of lamellar phyllosilicate mineral particles, a particularly effective method for increasing specific surface area is to fracture particles of the mineral and preferably to delaminate the mineral particles. In the present context, the term "fracture" shall include all forms of breaking the mineral particles, including delamination. Lamellar phyllosilicate minerals are crystalline silicate minerals which show a pronounced propensity toward cleavage perpendicular to one (and only one) crystalline axis. This arises as a result of much weaker bonding forces parallel to this particular crystallographic axis. When subjected to stress these lamellar materials tend to break along the planes where the bonding strength between adjacent planes is least.

Delamination is an extremely effective mechanism for increasing the surface area of lamellar materials because the relative amount of energy required to produce or expose additional surface area by delamination is much less than by other modes of fracture. In addition, the resulting delaminated materials are especially effective in applications where they are to be bonded to some other material. In this regard, due to the weak bonds between the individual plates of a lamellar material, lamellar materials are often relatively undesirable as reinforcing fillers in applications involving binding the lamellar material to a second material. Generally only the exterior surfaces of the lamellar material can be bonded to the second material, and, even if such bond is strong, the individual platelets are relatively weakly bonded to one another and may tend to slide over one another or otherwise separate from one another by interlaminar forces, when subjected to stress. Consequently, the laminations may tend to weaken the reinforcing capability of lamellar materials as fillers. Delamination eliminates the weak bonds between the platelets and thereby affords a delaminated material having potentially greater reinforcing characteristics over its laminated predecessor. Furthermore, the newly exposed surfaces of the resulting delaminated platelets may have especially good bonding characteristics due, for example, to active sites that may be formed thereon as a result of the energetic process associated with the particular delamination technique employed.

Numerous techniques have been proposed for increasing the surface area of silicate minerals. For example, Khodakov and Rebinder, Kolloidnyi Zhurnal Vol. 22, No. 3, pp. 365–375 (1960) disclose a process in which talc is ground in water, acetone or an alcohol such that the resulting ground particles have a relatively higher specific surface area and specifically illustrate increased specific surface areas as high as about 140 square meters per gram. The authors indicate that grinding the talc particles in the presence of less than about 5 percent of water, acetone or alcohol produces a significant increase in the specific surface area of the ground particles relative to the unground talc particles, but that grinding the talc particles in greater relative amounts of such liquids results in a decrease in the specific surface area of the ground particles relative to the unground talc particles. Though not mentioning talc, the authors indicate that particles of certain other materials can be ground once in a liquid and then ground again briefly in water in order to destroy any aggregates formed during the first grinding step and thereby to effect an apparent increase in the specific surface area.

Khodakov and Edelman, "Experimental Investigation of Spontaneous Dispersion in Molecularly Compact Solid Aggregates, "Kolloidnyi Zhurnal, Vol. 31, No. 5, pp. 771–776, September-October, 1969 cite the aforesaid article of Khodakov and Rebinder and disclose several treatments of minerals which result in an increase in surface area. The main thesis of the article is that grinding particles of a mineral may introduce defects and internal stresses into the particles and that, in a dispersed phase consisting of particles containing such defects and internal stresses, an increase in the degree of dispersion as a result of the spontaneous dispersion of such particles is feasible.

Using the examples of finely ground powders of quartz, calcite, corundum, and talc, consisting of molecularly compact aggregates of particles, the authors investigated the process of spontaneous dispersion. The effective specific surfaces of these powders (according to the BET method) was measured after a long-term holding in water. The study was made of highly dispersed powders of quartz, synthetic corundum, talc, and calcite, obtained by fine vibrational grinding either in air or in water, toluene, dichloroethane, acetone, ethyl alcohol, or amyl alcohol. The authors point out that in several experiments, the liquids amounted to a few percent of the weight of the powder. The authors do not indicate specific percentages when the liquid grinding additives amounted to a larger percent of the weight of the powder. Furthermore, no indication is given of a difference in the form of the ground particles obtained by grinding particles in non-polar organic liquids or polar liquids such as water.

Khodakov and Edelman disclose that, by grinding, particles of the powders can be obtained in the form of unique, very dense aggregates made up of primary particles whose internal surfaces are not accessible to measurement by any of the methods of dispersion analysis, including the BET adsorption method. The authors also indicate that the molecularly compact aggregates are individual continuous solids, but with defects.

After grinding, the powders were dried and then were held for a long period of time at room temperature, either in water or in heptane, acetone or dimethylformamide. The kinetics of spontaneous dispersion (decomposition) were evaluated from the change with time of the specific surface (S) of the dried powders, as measured by the BET method from the adsorption of nitrogen. Khodakov and Edelman stated that Khodakov and Rebinder in their aforesaid article previously established the presence in the ground particles of molecularly compact aggregates of particles by short-term grinding of the powders in water and illustrated that molecularly compact aggregates decompose with relative ease with short-term grinding in an aqueous medium.

Of the powders employed in the study of Khodakov and Edelman, only quartz and talc are silicate materials, and only talc is a phyllosilicate mineral. As indicated in their article, the authors noted that it followed from FIGS. 1 and 2 that the rate of growth of the specific surface depends substantially on the grinding conditions of the powders and that a particularly great effect of spontaneous dispersion is observed for talc "under the given conditions." The only indication in the article of the conditions for grinding talc appear in the descriptive note beneath FIG. 1, where it is stated that the talc is dry-ground and thereafter stored for a period of over two months in water. Under such conditions, the specific surface of the talc increased to a maximum of about 90 square meters per gram within about three weeks of storage in the water. The temperature of the water and the relative amounts of talc and water are not indicated.

In addition, there are other references to grinding phyllosilicate minerals in an organic liquid. For example, Rosenthal, U.S. Pat. No. 230,538 discloses that asbestos or amianthus is contacted with coal oil, benzene, benzole, or other equivalent hydrocarbons, which may be cold or heated or applied under both heat and pressure, whereby the fibers of the asbestos or amianthus are reduced to a condition which permits their disintegration manually or mechanically.

Davenport, U.S. Pat. No. 1,829,039 discloses a method for producing mica powder by triturating fragmentary sheets of mica in water or other suitable liquid by a rubbing action. Water is the only liquid specifically disclosed.

Thomson, U.S. Pat. No. 1,950,829 discloses a method of treating vermiculite to provide thin sheets of micaceous material which comprises crushing the vermiculite, soaking the crushed vermiculite in water for a long enough time to permit the water to penetrate between the layers of the micaceous material, removing the soaked material from excess or superficial water, heating the removed material to a temperature of about 1800° F. The resulting thin sheets may be further ground in water or oil to provide fine, thin particles.

Heyman, U.S. Pat. No. 2,405,576 discloses a method for splitting sheets of mica by striking the edge of the mica with a jet of a liquid, thus splitting it. The patent includes a statement that, although methyl alcohol or distilled water is preferred as the liquid, other liquids may prove to be equally effective for the purpose. Such other liquids are not identified.

Jacobs et al., U.S. Pat. No. 3,313,492 discloses a method for grinding finely-divided talc in water or other liquid, using a dispersing agent, if necessary, to impart fluidity to the slip. Water is the only liquid specifically disclosed.

None of the aforesaid references disclose a method which produces a product whose specific surface area is, or can be increased by additional treatment to, greater than about 140 square meters per gram. Moreover, the water soaking treatments following the grinding operations in Khodakov and Rebinder and in Khodakov and Edelman require additional grinding or excessive soaking time, respectively.

OBJECTS OF THE INVENTION

It is therefore a general object of the present invention to provide an improved method for treating phyllosilicate mineral particles to afford particulate materials having a greater specific surface area than the particles from which they are formed.

It is an additional object of the present invention to provide an improved method for increasing the specific surface area of phyllosilicate mineral particles to form a first particulate product which is capable of being treated to form a second particulate product having an extremely high specific surface area, and to provide the first product from such method.

It is a further object of the present invention to provide an improved method for treating phyllosilicate mineral particles which affords a particulate product comprising a composite of the phyllosilicate mineral and an organic material and having an increased specific surface area, and to provide the product from such method.

Other objects and advantages of the invention will become apparent upon reading the following detailed description and appended claims, and upon reference to the accompanying drawings.

SUMMARY OF THE INVENTION

These objects are achieved by an improved method for treating a phyllosilicate mineral comprising: (a) forming a slurry comprising up to about 40 weight percent of phyllosilicate particles in an organic liquid having a dielectric constant less than 35; (b) grinding the slurry at a sufficiently low temperature to avoid substantial loss of the liquid through vaporization and with sufficient force to fracture the particles therein and thereby to produce particulate materials therefrom having a greater specific surface area than the particles from which they were formed; and (c) separating the particulate materials from the organic liquid. In another respect, the present invention is the product from the aforesaid method of the present invention.

BRIEF DESCRIPTION OF THE DRAWINGS

For more complete understanding of this invention, reference should now be made to the embodiments illustrated in greater detail in the accompanying drawings and described below by way of examples of the invention. In the drawings.

It should be understood that the drawings are not to scale, and embodiments are illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

As a general proposition, silicates can be broadly divided into four groups according to crystal structure. The first group is made up of massive silicates with bonds more or less equally strong in three dimensions, giving rise to isodimensional particles. The second group is made up of lamellar or layer-type silicates (the phyllosilicates) in which the bonds are strong in two dimensions but relatively weak in the third, giving rise to layer-like structures. The third group is made up of needle-like or acicular-type silicates in which the bonds are predominantly strong in one dimension but relatively weak in the other two. The fourth group is made up of those silicates in which the crystal structure is so little developed that they may be classified as amorphous.

The method and composition of the present invention concern the aforesaid second group made up of lamellar phyllosilicate minerals which show a pronounced tendency toward cleavage perpendicular to one (and only one) crystalline axis. This arises as a result of much weaker bonding forces between the lamella parallel to this particular crystallographic axis. When subjected to stress, these lamellar materials tend to break along the planes where the bonding strength between adjacent planes is least.

The phyllosilicates comprise the class of silicate minerals in which the silicon-oxygen tetrahedral groups are linked by sharing three oxygens of each tetrahedron with other tetrahedra so as to form sheets of indefinite extent, in which the ratio of silicon to oxygen is 2:5. Phyllosilicate minerals generally comprise a multiplicity of individual sheets, each having a particular crystalline structure where each of the sheets or layers is weakly attached to adjacent sheets by electrostatic attraction, Van Der Waals forces or hydrogen bonding involving four out of six hydroxyl groups per unit cell of the crystalline structure. Delamination is the separation of such adjacent sheets or layers.

The numerous phyllosilicate minerals can be grouped into seven different subclasses. The first subclass is characterized by a two-layer structure and is made up of the kaolin group (kaolinite, dickite, nacrite, metahalloysite, halloysite, allophane and anauxite) and the septechlorite group (serpentine, chrysotile, antigorite, picrolite, lizardite, garnierite, pecoraite, greenalite, berthierite, bementite, amesite, grovesite and cronstedtite). The second subclass is characterized by primitive three-layer structures and comprises pyrophyllite, talc, minnesotaite and willemseite. The third subclass is made up of the micas (leucophyllite, celadonite, glauconite, phengite, alurgite, mariposite, illite, brammallite, hydromuscovite, muscovite, paragonite, roscoelite, fuchsite, ollacherite, sericite, taeniolite, polylithionite, lepidolite, zinnwaldite, manganophyllite, hendricksite, biotite, phlogopite, siderophyllite, annite, and lepidomelane.) The fourth subclass is made up of the brittle micas: margarite, bityite, ephesite, xanthophyllite, clintonite and anandite. The fifth subclass is characterized by expandable three-layer structures and is made up of the smectites (montmorillonite, beidellite, nontronite, volchonskoite, hectorite, saponite, stevensite, sauconite, and pimelite) and vermiculite. The sixth subclass is characterized by four-layer structures and is made up of chlorite, thuringite, chamosite, ripidolite, brunsvigite, diabandite, sheridanite, elinochlore, penninite, ferrian, chromian, kammererite, manganian, pennantite, gonyerite, nimite and cookeite. The seventh subclass is made up of other layer structures also known as pseudo-layer silicates and is made up of apophyllite, sanbornite, gillespite, cuprorivaite, palygorskite, sepiolite, prehnite, stilpnomelane, fenaksite, chrysocolla, krauskopfite, okenite, nekoite, stillwellite, ekanite, the melilite group (gehlenite, akermanite and hardystonite), leucophanite, meliphanite, datolite, gadolinite, homilite, leucosphenite, dalyite, astrophyllite, kupletskite, and niobophyllite.

In the method and composition of the present invention, the phyllosilicate preferably is a member of the kaolin group, a member of the mica group, a member of the group characterized by a primitive three-layer structure, a member of the group characterized by an expandable three-layer structure or a member of the group characterized by a four-layer structure. The phyllosilicate mineral more preferably is kaolinite, muscovite, pyrophyllite, talc, vermiculite or chlorite, and most preferably is talc.

Any organic material which is a liquid under the conditions of the method of this invention and which has a dielectric constant less than 35, preferably less than 30, can be used as the liquid in which the phyllosilicate mineral particles are slurried in the method of this invention. Suitable liquids include hexane, heptane, octane, cetane, methyl and ethyl alcohols, kerosene, diesel fuel, oleic and linoleic acids, butadiene, styrene, toluene diisocyanate, isoprene and acrylonitrile. Preferably, a liquid which is suitable for use as the slurry liquid boils in the range of from about 50° C. to about 400° C. and comprises at least one aliphatic or aromatic compound having from 5 to 25 carbon atoms, a distillate fuel or at least one fraction or component thereof, or a mixture thereof. More preferably, the organic liquid comprises hexane, cetane, a kerosene, diesel fuel or a mixture thereof.

Although not intending to be bound by any theoretical interpretation, it is believed that in the course of the grinding process, a major amount of the fracturing of particles which occurs is delamination. In the delamination process, the newly exposed surfaces produced possess irregularities at each of which there is a concentration of positive or negative charge. In a slurry medium having a high dielectric constant, such as water, the slurry medium permits such charges to be separated, thereby discouraging the aggregation process. In the absence of a flocculant additive, the delaminated particles have little tendency to flocculate in such a slurry medium. Upon separation of the delaminated particles from the slurry medium, the delaminated particles tend to coalesce to form a solid mass that cannot be recovered as separated delaminated particles. In the case of a liquid medium, such as water, having a dielectric constant greater than 35, after separation of the liquid medium, a cement-like, non-particulate mass remains, instead of the particulate material formed by the method of the present invention. In addition, the use of water as the slurry medium tends to produce surfaces having active sites which may form hydrates, which could contribute to the formation of the cement-like mass.

On the contrary, when an organic medium having a dielectric constant less than 35 is employed as the slurry liquid for the phyllosilicate mineral particles in the method of the present invention, the charges on the newly exposed surfaces of the delaminated layers of the mineral are not as effectively shielded by the liquid medium and therefore tend to aggregate. As a result, even though delaminated, in an organic liquid having a dielectric constant less than 35, the delaminated layers tend to in effect agglomerate or ball up to form aggregates which can be readily separated from the liquid without coalescing into a hardened mass and which exist as separate aggregated particles after separation of the liquid.

The size of mineral particles in the slurry liquid and the ratio of the weight of mineral particles to the weight of the slurry liquid are selected so that the mineral particles can be suspended in the slurry liquid and so that, if desired or necessary in the particular grinding operation employed, the slurry can be pumped. Generally, the lower, practical limit of the ratio of the weight of the mineral particles to the weight of the slurry liquid is that weight ratio below which excessive damage to the particular grinding or milling apparatus or medium, such as grinding balls, occurs. When the weight ratio of mineral particles to slurry liquid exceeds a weight ratio of about 0.4, preferably about 0.2, problems due to excessive viscosity of the slurry frequently arise. Above a weight ratio of 0.4, even if the viscosity of the slurry may not be excessive at the start of the grinding operation, it becomes excessive as grinding proceeds, due to the formation of additional particles and interactive surface sites in the slurry.

Preferably, the phyllosilicate particles employed in the method of the present invention are fine so that a greater percentage of the energy applied in the grinding or milling operation can be utilized to effect delamination, rather than other types of fracture, of the particles. Thus, it is preferred that the mineral particles originally introduced into the slurry have a specific surface area in the range of from about 1 to about 20 square meters per gram and a median particle size in the range of from about 1 to about 100 microns.

Any conventional grinder or milling device which is capable of providing sufficient energy to the phyllosilicate mineral particles in the slurry to effect fracture of the particles is suitable for use in the method of this invention. For example, devices such as a paint shaker or a ball or sand mill have been found suitable for use in the method of this invention. Generally, relatively longer residence times of the slurry are required in grinding mills which provide relatively small amounts of energy to the particles than in grinding mills which provide relatively large amounts of energy to the particles, in order to effect a given degree of fracture of the particles in the slurry. For economic reasons, it is generally desired to reduce the residence time of the slurry in the grinding mill, for example, by using a high energy mill. A high energy grinding mill providing sufficiently high energy to the particles in the slurry allows fracturing to be accomplished more quickly and thereby decreasing the required residence time in the mill in order to achieve a desired degree of fracturing of the particles. For example, suitable high energy grinding mills employing a drum containing grinding elements which are agitated by a rotating agitator are manufactured by Netzsch-Feinmachitechnik Gmbh. Unlike grinding mills having grinding chambers which are only partially filled with grinding elements such as steel shot or steel balls, each of the grinding chambers of the Netzsch mills incorporates a drum largely filled with grinding elements. A liquid containing suspended particles of the phyllosilicate mineral can be circulated through such a mill and an agitator extending into the chamber can be rotated to cause the grinding elements to move relative to one another, thereby grinding phyllosilicate particles between grinding elements.

Figure 1:
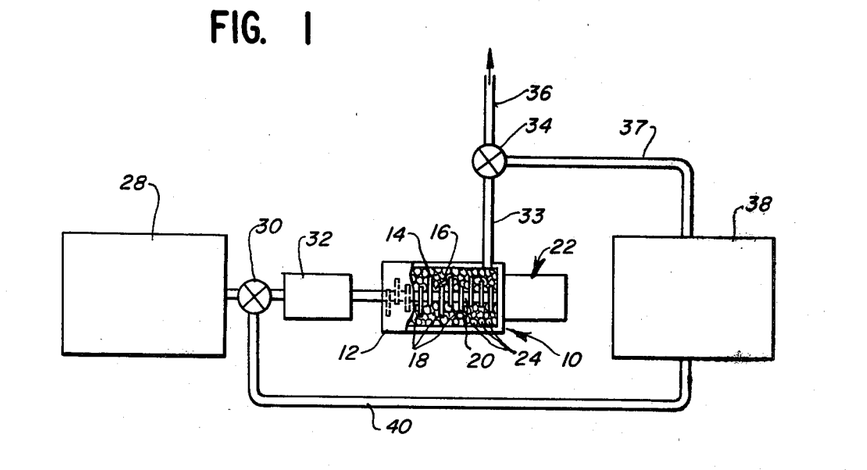
FIG. 1 is a schematic illustration of one embodiment of the method of this invention involving a high-energy agitator ball mill and withdrawal of the slurry of delaminated particles therefrom to avoid overheating of the slurry in the mill.

One specific embodiment of the method of the present invention is illustrated in FIG. 1. In FIG. 1, an apparatus useful in carrying out the method of the present invention is shown as an agitator mill 10 such as a Netzsch agitator mill. A nonmovable housing 12 defines a grinding chamber 14 in which the agitator 16 rotates. The agitator 16 comprises a plurality of eccentric annular agitating disks 18 which are fixed to an agitator shaft 20. A high-power motor 22 is attached to rotate the agitator 16 in the grinding chamber 14.

Approximately 80 percent of the volume of the grinding chamber 14 is occupied by the volume of grinding elements 24, including the void volume between the grinding elements 24, which may be, for example, mullite balls, steel balls or any other suitable grinding element. By largely filling the grinding chamber 14 with the grinding elements 24 and then rotating the agitator 16 to move the grinding elements 24, adjacent grinding elements 24 press against each other with much greater force than is possible when the volume of the grinding elements 24, including the void volume therebetween, occupy much less of the volume of the chamber 14. Hence, fracture of the mineral particles can be accomplished in a relatively short time even with those phyllosilicates whose lamella are held together with relatively strong forces, as is the case of those phyllosilicates characterized by a primitive three-layer structure.

In this embodiment, the grinding elements 24 are spherical and have a diameter in the range of about 1/32 inch to about 1/8 inch. The grinding elements 24 may be formed of any one or more of a different number of materials as previously indicated. However, it is recognized that the material constituting the grinding elements 24 may have an effect on the efficiency with which fracture is achieved.

In the embodiment illustrated in FIG. 1, a slurry is formed comprising a particulated phyllosilicate mineral and a liquid. The particle size range of the initial charge of the phyllosilicate mineral is sufficiently small to facilitate maintenance of the phyllosilicate mineral in suspension in the liquid. The slurry containing the suspended phyllosilicate particles to be ground is held in a holding tank 28 from which it is delivered through a valve 30 by a suitable pump 32 into the grinding chamber 14. Fracture occurs as the particles become trapped between adjacent grinding elements 24 which are dynamically pressing together in response to the rotation of the agitator 16. The speed of rotation of the agitator 16 and the residence time of the slurry in the grinding chamber 14 of the agitator mill 10 are set at sufficient levels to effect the desired degree of fracture. When the desired degree of fracture has been achieved, the slurry is withdrawn from the grinding chamber 14 through a line 33, a valve 34 and a line 36 to a product receiver (not shown).

It will be appreciated that the high energy required to rotate the agitator 16 is converted into heat which in turn heats the slurry as it passes through the grinding chamber 14. Consequently, the grinding chamber 14 is generally cooled by some suitable technique (not shown), for example, by circulating relatively cool water around the housing 12. In addition, depending upon the liquid medium of the slurry as well as various other factors, before the desired degree of fracture has been achieved, it may be necessary or preferable to remove the slurry from the grinding chamber 14 before it is heated to some preselected temperature, for example, the boiling point of the liquid or a lower temperature at which the liquid has a high vapor pressure. The withdrawn slurry containing fractured particles is then cooled, for example, by adjusting the valve 34 to direct the slurry through a line 37 to a holding tank 38 where it is allowed to cool. The cooling process can be accelerated by passing the slurry through a cooling or refrigeration apparatus (not shown) before passing the slurry to the holding tank 38. When the slurry in the holding tank 38 is sufficiently cool, the valve 30 is adjusted so that slurry is withdrawn from the holding tank 38 and passed through the line 40, valve 30 and pump 32 and into the grinding chamber 14 for additional grinding.

When a liquid having a dielectric constant greater than 35, such as water, without an added material which promotes aggregation of the ground particles, such as a flocculant, is employed as the slurry liquid in the method of this invention, after grinding and separation of the slurry liquid, the resulting solid product is a cement-like cake which cannot easily be broken apart. Nevertheless, the solid product has a structure which can apparently be penetrated by nitrogen, and thus surface area measurements indicate that the solid product has a greater specific surface area than the phyllosilicate mineral particles originally present in the slurry.

On the contrary, when an organic liquid having a dielectric constant less than 35 is employed as the slurry liquid in the method of this invention, after grinding and separation of the liquid by filtration or any other convenient method, the resulting fractured solid product is a filter cake which crumbles under only slight pressure, to form fine particles which are useful as inert diluents or carriers, adsorbents, absorbents, and as fillers, for example in paper or rubber compositions and as pigments, for example in paints. In the present context, the product of the present method is a particulate material or is readily converted to the particulate form by the application of only slight pressure and is termed "particulate."

Figure 2:
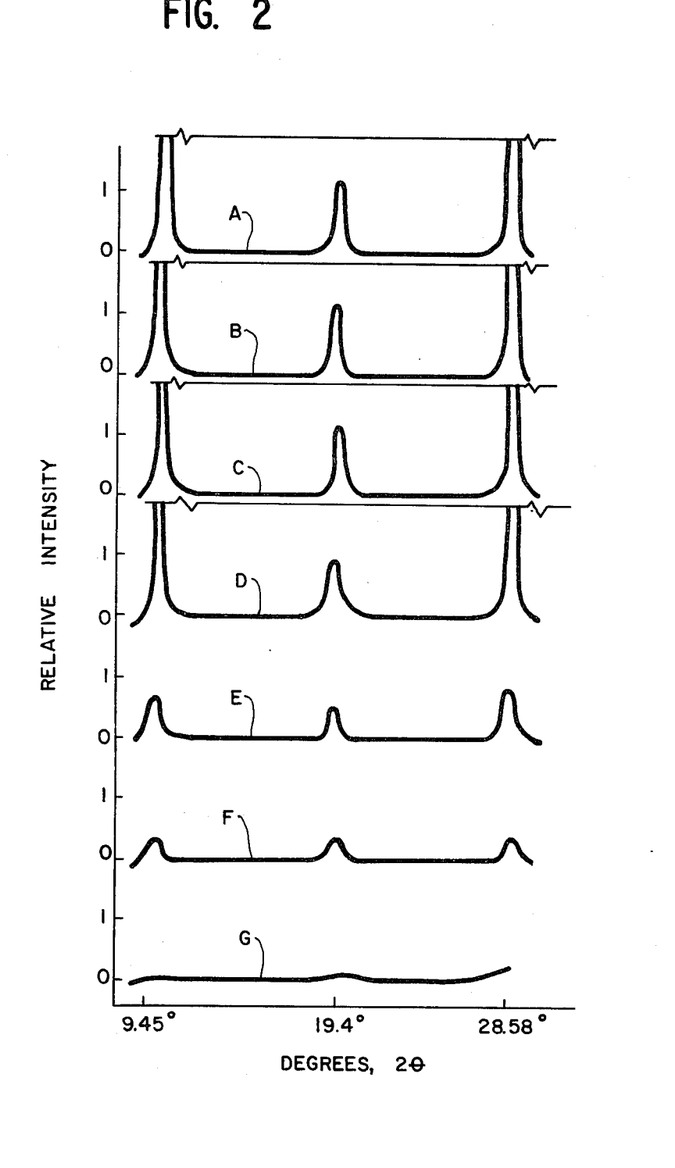
FIG. 2 contains simulated X-ray diffraction patterns for particles formed from phyllosilicate mineral particles by treatment in accordance with the method of the present invention.

The product of the method of the present invention is delaminated and differs in its essential characteristics from the phyllosilicate mineral from which it is formed. It is of course understood that, besides being delaminated, the products of this method are also fractured in other manners than by separation of the lamella. For example, FIG. 2 illustrates that the normal peaks on the X-ray diffraction Patterns A, B, C, D, E, F and G decrease in height as the period of grinding increases from 0.5 to 1, 3, 5, 14, 16 and 33 minutes, respectively, until in Pattern G after 33 minutes of grinding, the peaks disappear and talc crystallinity is no longer detectable by X-ray diffraction. At this point also the soft slippery feel of talc is no longer observed. The delaminated particles whose X-ray diffraction Patterns A, B, C, D, E, F and G are shown in FIG. 2 were obtained by grinding in a Netzsch mill LME-4 operated between 1250 and 1900 revolutions per minute (rpm), a slurry containing 10 weight percent of talc particles having a specific surface area of about 16 square meters per gram and a median particle size of about 1.1 microns, in kerosene.

Figure 3:
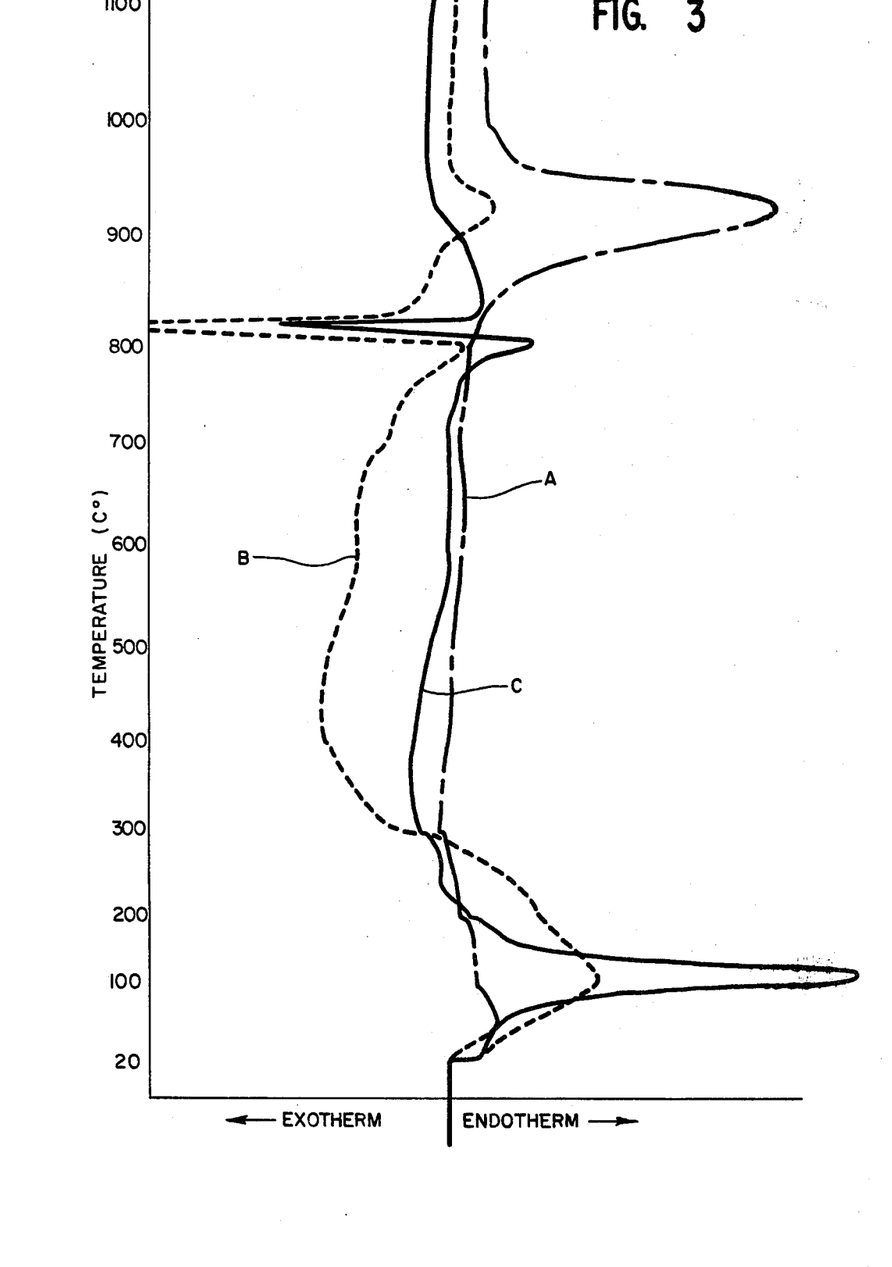
FIG. 3 contains differential thermal analysis curves for first particles as formed from phyllosilicate mineral particles by treatment in accordance with the method of the present invention, and for second particles as formed from the first particles by a subsequent treatment thereof in a polar fluid.

These results are consistent with the results of differential thermal analyses of delaminated particles produced by the method of this invention. As illustrated by Curve A in FIG. 3, a typical differential thermal analysis curve for only slightly ground talc has a strong endothermic peak at about 930° C. due to the dehydroxylation the talc crystal lattice and no pronounced exothermic peak. As the period of grinding increases, differential thermal analysis of the delaminated particles from the present method indicates that the intensity of the endothermic peak at 930° C. decreases and, as illustrated by Curve B in FIG. 3, this endothermic peak is greatly diminished after 2.8 minutes of grinding, and during this same period, a sharp exothermic peak appears at about 825° C. and increases in intensity with grinding time. The decrease in the intensity of the endothermic peak at about 930° C. reflects the destruction of the talc crystal lattice, and the appearance of the exothermic peak at about 825° C. is believed to represent either the release of strain energy or the oxidation of organic residues. A broad enthotherm between 20° C. and 300° C. is probably due to desorption of moisture and organic residue. The broad exotherm between 300° C. and 800° C. is probably due to partial oxidation of adsorbed organic residue. The delaminated particles whose differential thermal analysis Curve A is shown in FIG. 3 were obtained by grinding a slurry containing 10 weight percent of talc having a specific surface area of about 16 square meters per gram and a median particle size of about 1.1 microns in hexane for 1.4 minutes. The delaminated particles whose differential thermal analysis Curves B and C are shown in FIG. 3 were obtained by grinding a slurry containing 2 weight percent of talc particles having a specific surface area of about 16 square meters per gram in hexane for 2.8 minutes. In all cases, a Netzsch mill LME-22 operated at about 1000 rpm was employed.

Figure 4:
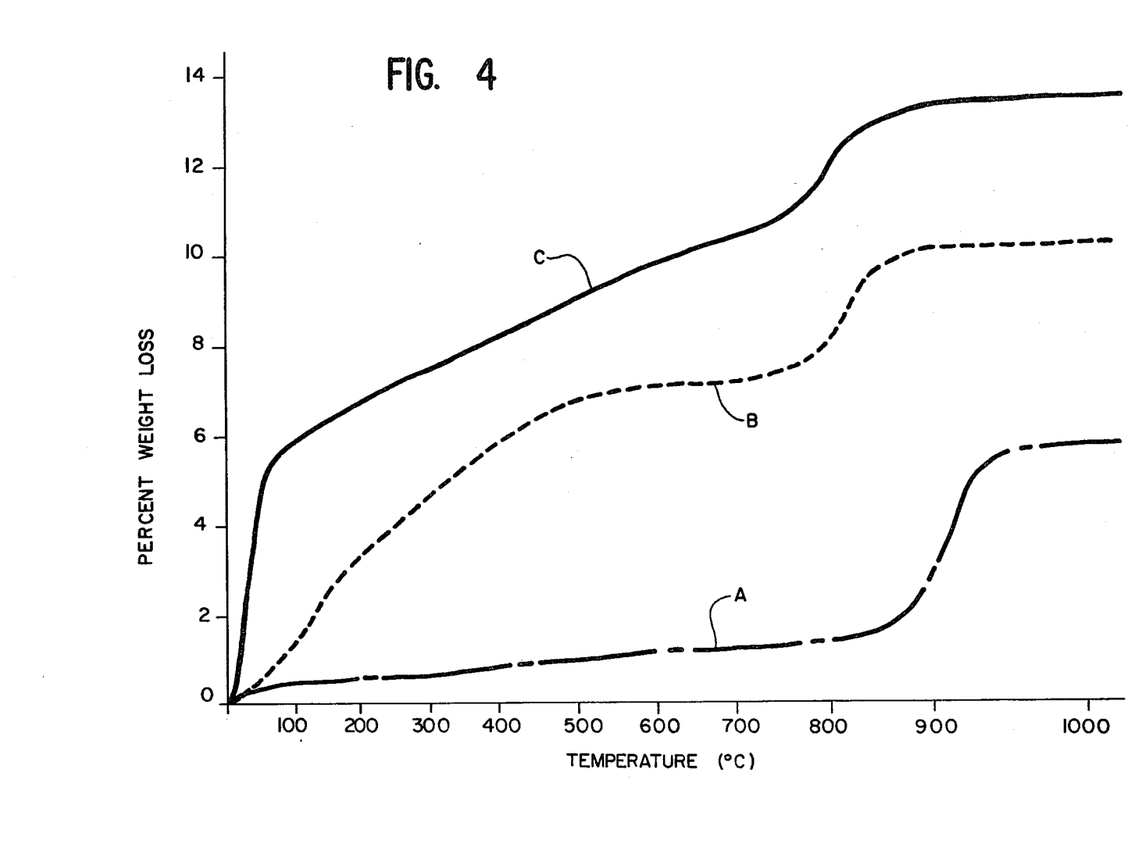
FIG. 4 contains thermal gravimetric analysis curves for first particles as formed from phyllosilicate mineral particles by treatment in accordance with the method of the present invention, and for second particles as formed from the first particles subsequent treatment thereof in a polar fluid.

As illustrated by Curve A in FIG. 4, a typical thermal gravimetric analysis curve for only slightly ground talc shows a weight loss beginning at about 850° C. due to the loss of chemically combined water. This curve has an inflection point at about 915° C. As the period of grinding increases, as illustrated by Curve B in FIG. 4, thermal gravimetric analysis of the delaminated particles from the present method indicates that an additional weight loss occurs between 100° C. and about 550° C., which increases as the grinding time increases. This weight loss probably represents removal of organic material, a portion of which is held so strongly that it is not completely removed until a temperature of 550° C. is reached. Furthermore, the inflection point of the curve for talc shifts from about 915° C. to about 825° C. The delaminated particles whose thermal gravimetric Curve A is shown in FIG. 4 were obtained by grinding a slurry containing 10 weight percent of the particles having a specific surface area of about 16 square meters per gram and a median particle size of about 1.1 microns in hexane for 1.4 minutes. The delaminated particles whose thermal gravimetric analysis Curves B and C are shown in FIG. 4 were obtained by grinding a slurry containing 2 weight percent of talc particles having a specific surface area of about 16 square meters per gram and a median particle size of about 1.1 microns in hexane for 2.8 minutes. In all cases, a Netzsch mill LME-22 operated at about 1000 rpm was used.

Figure 5:
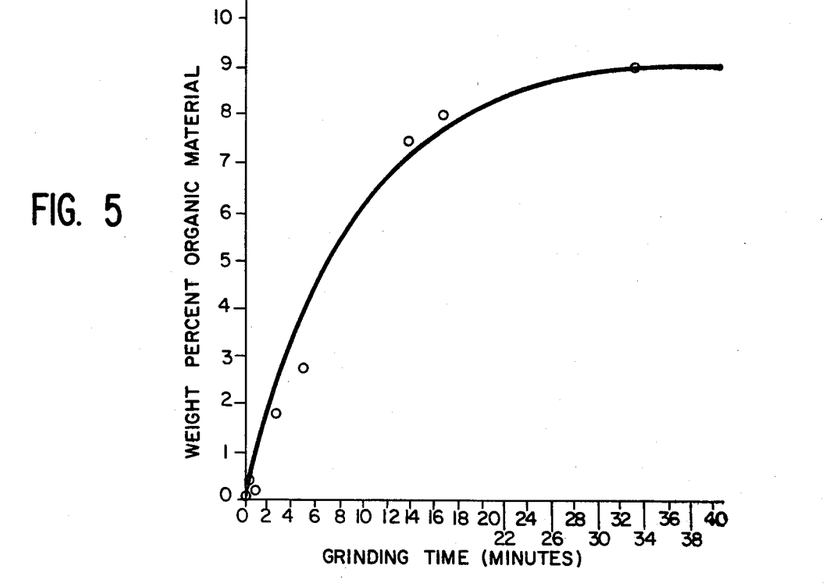
FIG. 5 contains a plot illustrating the relationship between the relative amount of organic material in the particles produced by the method of this invention as a function of the grinding time.

FIG. 5 is a plot of the weight percent of organic material in the delaminated particles produced by the method of this invention versus the grinding time (in minutes) of the slurry in the grinding chamber. The plot indicates that the aforesaid weight percent increases with the grinding time and gradually approaches a maximum level of about 9.5 weight percent. The amount of organic material in the delaminated particles was determined by thermogravimetric analysis. Since the manner in which the organic material is held in the dried ground particles is not known, the product formed in the method of the present invention shall simply be designated for the present purposes as a composite comprising an organic component or components. The delaminated particles whose organic contents are shown in FIG. 5 were obtained by grinding a slurry containing 10 weight percent of talc particles having a specific surface area of about 16 square meters per gram and a median particle size of about 1.1 microns, in kerosene in a Netzsch mill LME-4 operated at 1250–1900 rpm.

While the organic material in this composite has not been fully characterized, it is known that the organic material includes polar, water-soluble compounds. Infra red analysis indicates that organic compounds contain hydroxyl and/or carboxyl groups.

Figure 6:
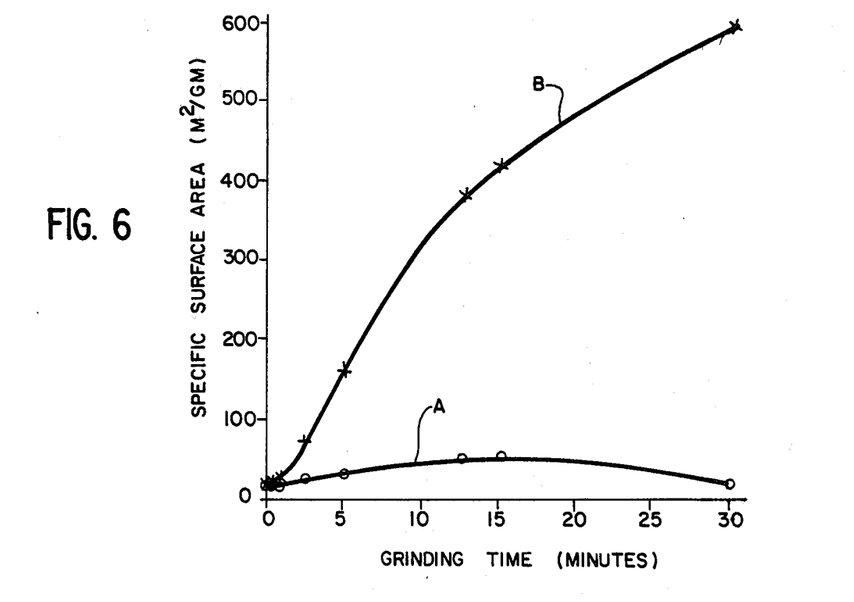
FIG. 6 contains plots illustrating the relationship between the grinding time and the specific surface area of first particles as formed from phyllosilicate mineral particles by treatment in accordance with the method of this invention, and for second particles as formed from the first particles by a subsequent treatment thereof in a polar fluid.

The variation of the specific surface area (in square meters per gram) of delaminated particles produced by grinding phyllosilicate mineral particles in the method of the present invention as a function of the grinding time in minutes is illustrated by Curve A in FIG. 6. The delaminated particles whose specific surface areas are plotted in Curves A and B in FIG. 6 were obtained by grinding a slurry containing 10 weight percent of talc particles having a specific surface area of about 16 square meters per gram and a median particle size of about 1.1 microns, in kerosene in a Netzsch mill No. LME-4 operated at 1250–1900 rpm. The specific surface areas of the delaminated products increase with the grinding time up to a particular grinding time, above which the specific surface area decreases with further increases in the grinding time, indicating the formation of aggregates having a lower specific surface area than the finer ground particles from which the aggregates are formed.

Similarly, scanning electron microscopic analysis of untreated talc particles and delaminated particles after various residence times in the grinding chamber indicate that the untreated talc particles and slightly ground delaminated particles have a flake-like appearance, but as the residence times increase, the more highly ground delaminated particles have a more ball-shaped appearance.

Figure 7:
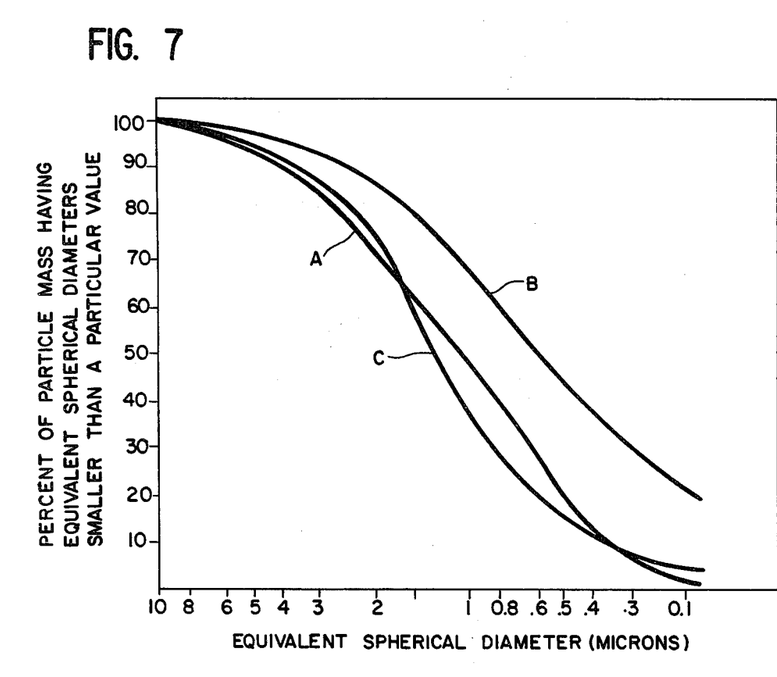
FIG. 7 contains particle size distribution curves of phyllosilicate mineral particles before, and of particles formed therefrom by, treatment in accordance with the method of this invention.

This same trend of decreasing particle sizes followed by increasing particle sizes as the grinding time increases is also evident from particle size distribution curves for delaminated particles obtained after various grinding times in the method of this invention. Curves A, B and C in FIG. 7 represent the particle size distributions for untreated talc having a specific surface area of about 16 square meters per gram and a median particle size of about 1.1 microns, and for delaminated particles obtained by grinding a slurry containing 10 weight percent of the aforesaid untreated talc for 5 minutes and 33 minutes, respectively, in kerosene. In each case, a Netzsch mill LME-4 operated at 1250–1900 rpm was used. Comparison of these curves at an equivalent spherical diameter of, for example, 1 micron, indicates that grinding initially increases the percentage of particle mass having an equivalent spherical diameter less than 1 micron, but prolonged grinding decreases the percentage of particle mass having an equivalent spherical diameter less than 1 micron. Similarly, comparisons of these curves indicates that initial grinding decreases the median particle size—as determined from a plot, as in FIG. 7, of the percent of particle mass with equivalent spherical diameters smaller than a particular equivalent spherical diameter versus equivalent spherical diameter, and defined as the equivalent spherical diameter below which 50 weight percent of the particles have their equivalent spherical diameters—from about 1.1 microns to about 0.6 micron, but prolonged grinding increases the median particle size from 0.6 micron to about 1.3 microns.

The particulate product of the method of this invention can be employed for numerous uses typical of phyllosilicate minerals, for example, as a diluent or carrier, adsorbent, absorbent, and as a filler, for example, in paper or rubber compositions, and as a pigment, for example, in paints. Preparation of rubber compositions containing the product of the method of this invention is conventional. In one suitable method of preparation, a batch of natural or synthetic rubber is initially mixed in a conventional roll mill or internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 pounds per hundred pounds of rubber (phr), a fatty acid, typically stearic acid, at a level of from about 0.5 to about 5 phr, and an antioxidant, typically butylated p-phenylphenol, at a level of from about 0.5 to about 5 phr, are introduced into the rubber during mixing. In the alternative, the oxide, fatty acid and antioxidant can be introduced initially with the rubber.

Mixing is then continued until the temperature of the mixture increases to a temperature in the range of from about 70° C. to about 80° C., at which point a softening agent such as process oil, and a particulate product made by any of the aforedescribed embodiments of the method of this invention are added. Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur, sulfur-donating agents (in combination with suitable accelerators) and peroxide and other free radical producing agents.

The resulting mixture is then removed from the Banbury mixer and formed into a predetermined shape for example, sheets. After storing overnight at room temperature, the shaped mixture is cured by pressure molding at 320° F. for about 0.2 hour.

Preparation of paper compositions containing the product of the method of this invention as a filler is conventional. In one suitable method of preparation, a newsprint blend containing 65 percent by weight of groundwood and 35 percent by weight of bleached softwood kraft pulp is used as the pulp furnish. The kraft portion is beaten to a Canadian Standard freeness of 550 while the groundwood is dispersed to its natural freeness in a Valley beater. The final freeness of the 65/35 blend is 310 Canadian Standard units. No acid or alum is added to the furnish which has a pH of 7.8.

A particulate product made by any of the aforedescribed embodiments of the method of this invention— employed as a filler—is pre-slurried in water to a to the pulp at this point at the rate of 1 pound per ton dry weight of paper. The filler is added at the level of 7 percent by weight (assuming retention of 70 percent by weight of the filler in the newsprint sheet). The calendar of the paper making machine is utilized with the weight of the rolls only. The newsprint is dried to a moisture content of approximately 5 percent by weight. A newsprint sheet of approximately 30 pounds per 3000 square foot ream is produced.

Preparation of paint compositions containing the product of the method of this invention is conventional. In one suitable method of preparation, to 142 parts by weight of oil-modified alkyd resin, 1.1 parts by weight of trisodium pyrophosphate, 0.5 part by weight of triethylamine, and 160 parts by weight of water are added 10.6 parts by weight of furnace black, 160 parts by weight of barites, 43 parts by weight of a particulate product made by any of the aforedescribed embodiments of the method of this invention and 53 parts by weight of barium metaborate. The mixture is pebble-milled for 18 hours. To the milled mixture is added 213 parts by weight of the oil modified alkyd resin, 0.6 part by weight of 6 percent magnesium naphthenate, 5 parts by weight of butanol and 249 parts by weight of water. The mixture is stirred to produce a black primer.

It is useful to treat the product of the method of this invention with the additional step of treating the separated delaminated particles from the aforesaid grinding operation in a polar fluid having a dielectric constant of at least 60. Suitable fluids include water, aqueous hydrogen peroxide, ammonia and numerous aqueous solutions, as well as highly polar organic materials. Preferably the fluid is in the liquid state. It is also preferred that the fluid is water or aqueous hydrogen peroxide. The treatment in the highly polar fluid is effected preferably at a temperature of at least about 20° C., more preferably at least about 50° C. and preferably at a pressure of at least about 25 millimeters of mercury, more preferably at least about 760 millimeters of mercury. The weight ratio of dried ground particles to the polar fluid is in the range of from about 0.01, preferably from about 0.1, to about 0.6, preferably to about 0.2. The dried ground particles are treated in the polar fluid preferably for a time in the range of from about 1 minute, more preferably from about 30 minutes, to about 30 days, more preferably to about 1 day.

Treatment of the separated delaminated particles in the polar fluid results in a very substantial increase in the specific surface area of the particles and the removal of a portion of the organic material(s) therefrom. While the explanation for this increase in the specific surface area is not fully understood, removal of the organic material(s) could uncover previously inaccessible surface area or could cause a loss of adhesion within the agglomerates, thereby permitting the agglomerates to relax and develop additional internal porosity. Furthermore, the polar fluid could neutralize ionic and coulombic forces that may be holding the agglomerate together, thereby permitting the agglomerate to expand. Scanning electron microscopic analysis indicates that the delaminated aggregates appear to unfold as a result of the treatment with the polar fluid.

The delaminated particles whose specific surface areas (measured prior to treatment with the polar fluid) are plotted in Curve A in FIG. 6 were subsequently treated with a solution containing 15 weight percent of hydrogen peroxide in water for 3 days and at a temperature of about 30° C. The specific surface areas after the hydrogen peroxide treatment are plotted against the residence time of the original slurry in the grinding chamber in Curve B in FIG. 6. Comparison of Curves A and B in FIG. 6 illustrates the effect of the polar fluid treatment on the specific surface areas of the delaminated particles which have been previously ground in an organic liquid having a dielectric constant of less than 35.

As indicated in Curve B in FIG. 6, the delaminated particles which had been ground in the mill for 33 minutes and thereafter treated with the polar fluid had a specific surface area of 590 square meters per gram, or about 77 percent of the theoretical maximum specific surface area for talc of 767 square meters per gram, calculated using the method described in Van Olphen, "An Introduction to Clay Colloid Chemistry," Interscience Publishers, N.Y. (1963), on page 244. This indicates that the average delaminated particle is only 1.3 molecular layers in thickness, that is, is almost totally delaminated, neglecting edge effects.

On the contrary, when phyllosilicate mineral particles are ground in a liquid having a dielectric constant greater than 35, such as water, not containing an additive which promotes aggregation such as a flocculant, subsequent treatment of the ground particles in a polar fluid having a dielectric constant greater than 60 is not effective in increasing the specific surface area of the ground particles.

Figure 8:
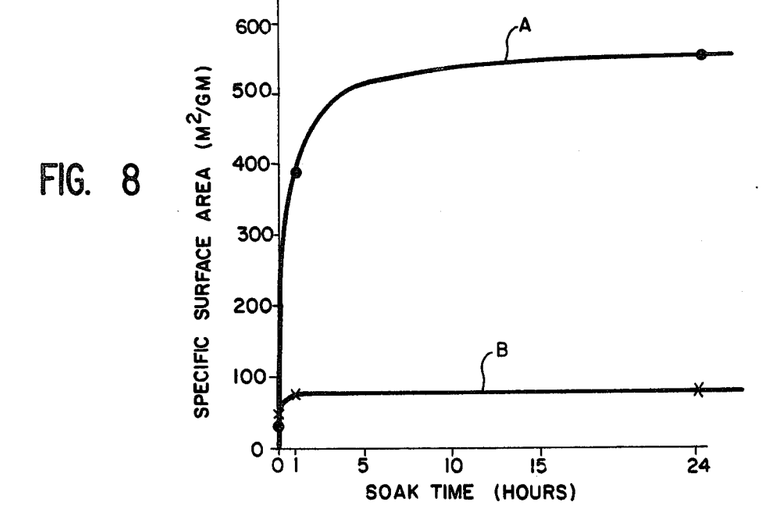
FIG. 8 contains plots illustrating the variation of the specific surface area of second particles produced by treatment with a polar fluid of first particles produced by the method of this invention, as a function of the time of treatment with the polar fluid.

FIG. 8 is a plot of the specific surface areas of delaminated particles produced by extensive grinding of a slurry containing 10 weight percent of talc particles having a specific surface area of about 16 square meters per gram and a median particle size of about 1.1 microns, in kerosene (Curve A) for a 33 minute grinding or by lesser grinding a slurry containing 10 weight percent of talc particles having a specific surface area of 12.9 square meters per gram and a median particle size of about 1 micron, in hexane (Curve B) for 6.6 minutes in a Netzsch mill LME-18 operated at 500 rpm, measured after treatment of the delaminated particles in water at 100° C., versus the length of time of treating or soaking the delaminated particles in the water. Curve A indicates that the specific surface areas of the delaminated particles have essentially reached a plateau after the delaminated particles had soaked for about 10 hours in water. Curve B indicates that the specific surface areas of the delaminated particles have reached a plateau after the delaminated particles had soaked for about one hour in water. Thus, at elevated temperatures only relatively short soaking times are necessary to fully develop the specific surface areas of delaminated particles in the preferred method of this invention.

Figure 9:
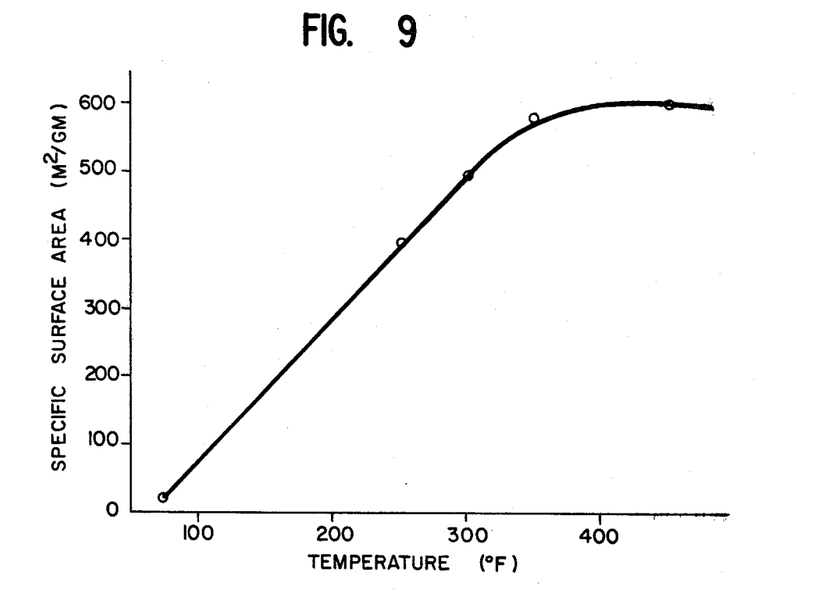
FIG. 9 contains a plot illustrating the variation of the specific surface area of second particles produced by treatment with a polar fluid of first particles produced in accordance with the method of this invention, as a function of the temperature of the polar fluid.

FIG. 9 is a plot of the specific surface areas of delaminated particles produced by the method of this invention and measured after treatment in water for about 30 minutes, versus the temperature at which the water treatment is performed. FIG. 9 illustrates that the specific surface area of the delaminated particles increases with the polar fluid treatment temperature until the temperature reaches about 350° F., above which the specific surface area does not increase with further temperature increases. Treatment in water at room temperature did not effect a detectable increase in the specific surface area of the delaminated particles at the short treatment times used. The delaminated particles whose specific surface areas are plotted in FIG. 9 were obtained by grinding a slurry containing 10 weight percent of untreated talc particles having a specific surface area of about 16 square meters per gram and a median particle size of 1.1 microns, in kerosene, with a grinding time of 33 minutes in a Netzsch mill LME-4 operated at 1250–1900 rpm.

Figure 10:
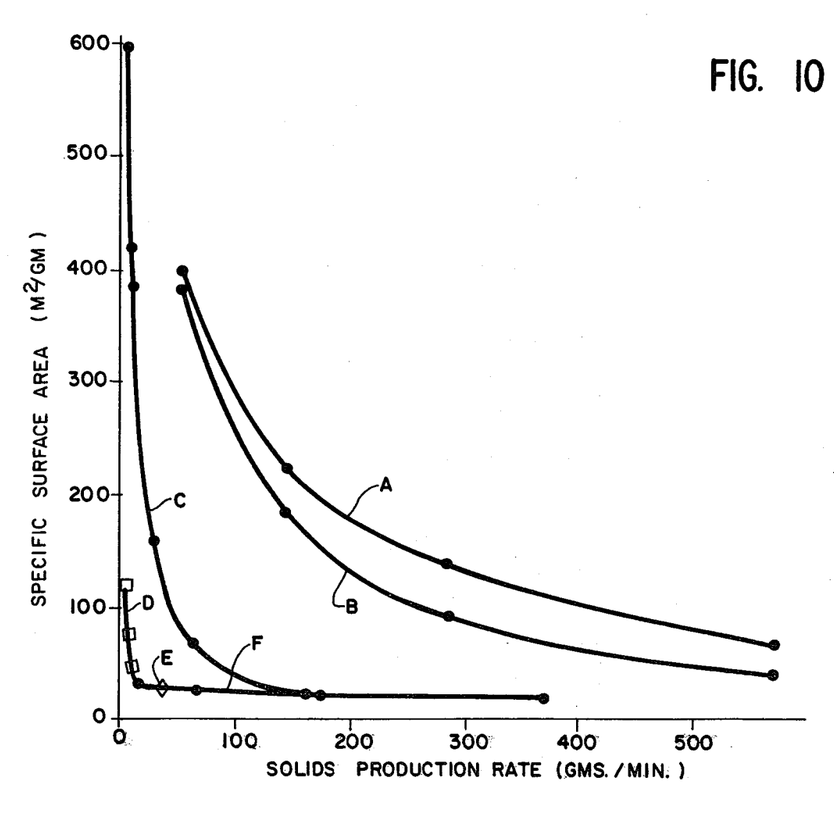
FIG. 10 contains plots illustrating the variations with the solids production rates of the specific surface areas of second particles produced by treatment with a polar fluid of first particles resulting from grinding phyllosilicate mineral particles in various liquids and at various energy levels of grinding.

FIG. 10 contains plots of the specific surface areas of delaminated particles produced by grinding talc particles alternately in kerosene, hexane and cetane and subsequently treated in water, versus the solids production rate (measured in grams of solid product per minute of residence time in the grinding mill). The solids production rate is the product of (1) the quotient of the feed rate (in milliliters of the talc-liquid slurry per minute) to the grinding mill divided by the number of passes through the mill, multiplied by (2) the weight of talc particles per unit volume of slurry liquid (in grams per milliliter). Curves A and B were each plotted from data for particles obtained by grinding slurries containing 10 or 2 weight percent of talc particles in hexane in a Netzsch mill LME-22 operated at 900–1000 rpm and subsequently autoclaved in water at about 205° C. for 30 minutes. Curves C, D and F and datum point E were plotted from data for particles obtained by grinding slurries of talc particles in various liquids and under various conditions and then autoclaving the delaminated particles in water at about 205° C. for about 30 minutes, except for the particles used in obtaining Curve D which were not treated with the polar fluid. Curve A was obtained using talc from one deposit and having a specific surface area of about 12 square meters per gram, while Curves B, C, D and F and datum point E were obtained using talc from a different deposit and having a specific surface area of about 16 square meters per gram and a median parrticle size of about 1.1 microns. The slurries employed for Curves C, D, datum point E and Curve F contained 10, 2.5, 10, and 10 weight percent, of talc particles. For Curve D, the mill was operated at about 1900 rpm.

Although a different slurry liquid (hexane) was employed for Curves A and B than the slurry liquid (kerosene) employed for Curve C, it is believed that the difference between specific surface areas for Curves A and B and the specific surface areas for Curve C at a particular solids production rate represents the fact that the higher energy Netzsch mill LME-22 was employed for Curves A and B than the Netzsch mill LME-4 employed for Curve C. Further, although the same mill and talc particles from the same source were employed for Curves C and F (and D) and datum point E, and although kerosene was employed as the slurry liquid in Curve C and datum point E (cetane was used for Curve F), the surface area for Curve F and datum point E are lower than for the comparable points on Curve C because the mill was operated at 1250–1900 rpm for Curve C and held constant at only 1300 rpm for datum point E. Moreover, even though the same mill and talc particles from the same source were used for Curves C and D and the mill was in fact operated at a higher average number of revolutions per minute for Curve D than for Curve C, the specific surface areas in Curve D are substantially less than those for comparable points on Curve C, because water was the slurry liquid for Curve D. Furthermore, FIG. 10 demonstrates that at relatively low values of the solids production rate, the increases in specific surface area are relatively high in all cases.

Thus, depending upon the choice of grinding conditions, for example, the solids production rate and grinding energy, the novel product resulting from the polar fluid treatment of the product of the method of the present invention may be designed to have an extremely high specific surface area. Although the polar fluid treatment removes some of the organic material from the delaminated particles of the method of this invention, the resulting product still includes a substantial organic content and is a composite of polar treated delaminated inorganic particles and organic material. Only slight pressure is necessary to reduce this product to the form of fine particles, and hence this product is particulate in form. Furthermore, unlike typical talc, the product of the treatment with the polar fluid is hygroscopic and dispersible in water.

As shown by Curve C in FIG. 3, differential thermal analysis of the product of the polar fluid treatment indicates the appearance of a sharp endotherm at about 105° C. due to the removal of adsorbed water, and a decrease in the exotherm at 925° C. possibly due to a release of strain energy and removal of oxidizable impurities during the treatment with the polar fluid. In Curve C, the differential thermal analysis was performed after the particles were treated in water at about 205° C. for about 30 minutes.

As illustrated by Curve C in FIG. 4, thermal gravimetric analysis of the product of the polar fluid treatment indicates the removal of water and organic material and a further shift to lower temperatures of the inflection point of the normal talc curve.

In all of the instances described above, at least about 80 percent of the volume of the grinding chamber of the Netzsch mill used was occupied by grinding balls. In all cases also, the grinding balls employed were steel and had a diameter of about 2 millimeters. Furthermore, in all cases, the temperature of the grinding operation was maintained at a sufficiently low level that the loss of slurry liquid was substantially less than that needed to raise the concentration of solids in the slurry above 40 weight percent. The ratios of the weight of particles to the weight of the polar fluid medium for all data points for Curve C in each of FIGS. 3 and 4, Curve B in FIG. 6 and all curves in FIGS. 8–9 were less than 0.43.

The composite product of the polar fluid treatment of the product of the method of this invention can be employed for numerous uses typical of phyllosilicate minerals, for example, as diluents or carriers, adsorbents, absorbents, and as fillers in compositions such as paper or rubber compositions, or as pigments, for example, in paint.

Preparation of rubber compositions containing the particulate product of the aforesaid polar fluid treatment of the product of the method of this invention is conventional. In one suitable method of preparation, a batch of natural or synthetic rubber is initially mixed in a conventional roll mill or internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 pounds per hundred pounds of rubber (phr), a fatty acid, typically stearic acid, at a level of from about 0.5 to about 5 phr and an antioxidant, typically butylated p-phenyl-phenol, at a level of from about 0.5 to about 5 phr are introduced into the rubber during mixing. In the alternative, the oxide, fatty acid and antioxidant can be introduced initially with the rubber.

Mixing is then continued until the temperature of the mixture increases to a temperature in the range of from about 70° C. to about 80° C., at which point a softening agent such as process oil, and a particulate product made by any of the aforedescribed embodiments of the aforesaid polar fluid treatment of the product of the method of this invention are added. Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur, sulfur-donating agents (in combination with suitable accelerators) and peroxide and other free radical producing agents.

The resulting mixture is then removed from the Banbury mixer and formed into a predetermined shape for example, sheets. After storing overnight at room temperature, the shaped mixture is cured by pressure molding at 320° F. for about 0.2 hour.

Preparation of paper compositions containing the particulate product of the aforesaid polar treatment of the product of the method of this invention as a filler is conventional. In one suitable method of preparation, a newsprint blend containing 65 percent by weight of groundwood and 35 percent by weight of bleached softwood kraft pulp is used as the pulp furnish. The kraft portion is beaten to a Canadian Standard freeness of 550 while the groundwood is dispersed to its natural freeness in a Valley beater. The final freeness of the 65/35 blend is 310 Canadian Standard units. No acid or alum is added to the furnish which has a pH of 7.8.

A particulate product made by any of the aforedescribed embodiments of the aforesaid polar fluid treatment of the product of the method of this invention—employed as a filler—is pre-slurried in water to a solids content of 20 percent by weight. This slurry is metered into the aforementioned pulp blend via the stuff box of a paper making machine. A cationic retention aid, for example, Gendriv 162 of Dow Chemicals is also metered into the pulp at this point at the rate of 1 pound per ton dry weight of paper. The filler is added at the level of 7 percent by weight (assuming retention of 70 percent by weight of the filler in the newsprint sheet). The calendar of the paper making machine is utilized with the weight of the rolls only. The newsprint is dried to a moisture content of approximately 5 percent by weight. A newsprint sheet of approximately 30 pounds per 3000 square foot ream is produced.

Preparation of paint compositions containing a product of the aforesaid polar fluid treatment of the product of the method of this invention is conventional. In one suitable method of preparation, to 142 parts by weight of oil-modified alkyd resin, 1.1 parts by weight of trisodium pyrophosphate, 0.5 part by weight of triethylamine, and 160 parts by weight of water are added 10.6 parts by weight of furnace black, 160 parts by weight of barites, 43 parts by weight of a product of the aforesaid polar fluid treatment of the product made by any of the aforedescribed embodiments of the method of this invention and 53 parts by weight of barium metaborate. The mixture is pebble-milled for 18 hours. To the milled mixture is added 213 parts by weight of the oil modified alkyd resin, 0.6 part by weight of 6 percent magnesium naphthenate, 5 parts by weight of butanol and 249 parts by weight of water. The mixture is stirred to produce a black primer.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A method for treating a phyllosilicate mineral comprising:
    (a) forming a slurry comprising up to about 40 weight percent of phyllosilicate mineral particles in an organic liquid having a dielectric constant less than 35 and in the absence of a liquid having a dielectric constant of at least 35;

(b) grinding the slurry at a sufficiently low temperature to avoid substantial loss of the liquid through vaporization and with sufficient force to form a particulate composite of the phyllosilicate mineral particles and an organic material present in or formed from the organic liquid during grinding and to fracture the particulate composite and thereby to produce particulate composite materials having a greater specific surface area than the phyllosilicate mineral particles from which they were formed; and (c) separating the particulate composite materials from the organic liquid.

2. The method of claim 1 wherein the slurry comprises from about 2 to about 20 weight percent of the phyllosilicate mineral particles in the organic liquid.

3. The method of claim 1 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

4. The method of claim 3 wherein the phyllosilicate mineral is selected from the group consisting of kaolinite, muscovite, pyrophyllite, talc, vermiculite and chlorite.

5. The method of claim 4 wherein the phyllosilicate mineral is talc.

6. The method of claim 1 wherein, prior to being ground in step (b), the phyllosilicate mineral particles in the slurry have a median particle size of less than 1 millimeter in the largest dimension.

7. The method of claim 1 wherein the organic liquid has a dielectric constant less than 30.

8. The method of claim 1 wherein the organic liquid boils in the range of from about 50° C. to about 400° C. and comprises at least one aliphatic or aromatic compound having from 5 to 25 carbon atoms, a distillate fuel or at least one fraction or component thereof, or a mixture thereof.

9. The method of claim 1 wherein the phyllosilicate mineral particles are delaminated by the grinding operation of step (b).

10. The method of claim 1 wherein the slurry is ground until the specific surface area or median particle size of the particulate composite materials formed therein reaches a predetermined level therefor.

11. The method of claim 10 wherein the grinding in step (b) is performed until the temperature of the slurry rises above predetermined level therefor and thereafter the slurry is cooled to a temperature below the predetermined level therefor, and the sequence of grinding the slurry until its temperature rises above the predetermined level therefor and then cooling the slurry to a temperature below the predetermined level therefor is repeated until the specific surface area or median particle size of the particulate composite materials formed therein reaches the predetermined level therefor.

12. The method of claim 1 wherein the grinding is effected by circulating the slurry through a chamber containing a multiplicity of movable grinding elements, the volume of the grinding elements being at least about 80 percent of the volume of the chamber, and agitating the grinding elements as the slurry circulates through the grinding chamber to apply fracturing forces to the mineral particles trapped between adjacent grinding elements and to thereby form the particulate composite materials.

13. The method of claim 12 further comprising the steps of withdrawing the slurry from the grinding chamber before the temperature of the slurry exceeds a predetermined level therefor, cooling the slurry to a temperature below the predetermined level therefor and recirculating the cooled slurry through the chamber and agitating the grinding elements as the cooled slurry recirculates through the chamber, and repeating the sequence of withdrawing, cooling, and recirculating and agitating until the specific surface area or median particle size of the particulate composite materials formed therein reaches a predetermined level therefor.

14. The product formed by the method of claims 1, 2, 3, 4, 5, 6, 7, 8, 9, 10, 11, 12, or 13.

15. A particulate material comprising a solid particulate composite of talc particles and an organic material wherein the composite is formed by grinding a slurry containing up to 40 weight percent of talc particles in an organic liquid having a dielectric constant less than 35, and the organic material is present in or formed from the organic liquid during grinding.

* * * * *

UNITED STATES PATENT AND TRADEMARK OFFICE
CERTIFICATE OF CORRECTION

PATENT NO. : 4,391,734

DATED : July 5, 1983

INVENTOR(S) : Laurence E. Ferreira et al.

It is certified that error appears in the above-identified patent and that said Letters Patent is hereby corrected as shown below:

Column 2, line 37, "Aggregates", should read -- Aggregates," --

Column 13, line 53, "in water to a to the" should read
-- in water to a solids content of 20 percent by weight.
   This slurry is metered into the aforementioned pulp
   blend via the stuff box of a paper making machine. A
   cationic retention aid, for example, Gendriv 162 of Dow
   Chemical, is also metered into the --

Signed and Sealed this

Twentieth Day of December 1983

[SEAL]

Attest:

GERALD J. MOSSINGHOFF

Attesting Officer

Commissioner of Patents and Trademarks